United States Patent [19]

Mees et al.

[11] 3,970,723

[45] July 20, 1976

[54] IMPREGNATING AND ENCAPSULATING COMPOSITION FOR USE WITH TYPE TRANSFORMERS AND TRANSFORMERS CONTAINING SUCH COMPOSITION

[75] Inventors: Robert D. Mees; Gordon M. Bell, both of Fort Wayne, Ind.

[73] Assignee: General Electric Company, Carmel, Ind.

[22] Filed: July 31, 1974

[21] Appl. No.: 493,342

[52] U.S. Cl. .................... 260/880 R; 174/52 PE; 252/64; 336/96
[51] Int. Cl.² ........................................ C08L 9/00
[58] Field of Search .................. 260/880 R

[56] References Cited
UNITED STATES PATENTS
3,678,121  7/1972  McElroy .................. 260/94.2 M

*Primary Examiner*—Paul R. Michl

[57] ABSTRACT

A solventless resin composition comprising 100 parts by weight of a particular butadiene polymer, from 10 to 34 parts by weight of a vinyl monomer selected from the group consisting of t-butyl styrene and vinyl toluene, and from 5 to 11 parts, by weight, of an accelerating agent selected from the group consisting of trimethylol propane trimethacrylate, diallyl malleate, diallyl phthalate, and dioctyl fumarate is effective as a solventless impregnant or encapsulant for a dry type transformer.

14 Claims, 2 Drawing Figures

IMPREGNATING AND ENCAPSULATING COMPOSITION FOR USE WITH TYPE TRANSFORMERS AND TRANSFORMERS CONTAINING SUCH COMPOSITION

BACKGROUND OF THE INVENTION

In the past, the majority of dry type transformers have been impregnated with or encapsulated in resinous materials dissolved in solvents, particularly aromatic solvents. The solvents in these impregnants or encapsulants serve a multitude of purposes. For example, they dilute the resin solids or high viscosity liquids in order to provide a system viscosity which will assure complete impregnation or encapsulation of the transformer coil, and other insulating materials. Further, the solvents serve to separate or space the solvent-resin-activator system in order to minimize molecular contact reactions which would tend both to increase viscosity and shorten pot life.

However, the inclusion of the solvent in the impregnant or encapsulant also tended to increase processing cycles, increase energy costs, as energy was required to vaporize the solvent. and add to resin losses in the processing operation. Further, as the solvents employed were frequently vented to the atmosphere as they were evaporated from the transformers, they tended to significantly increase atmospheric pollution. Further, these solvents provided fire hazards, acted as cure retardants until they were evaporated from the product, and generated additional costs because of the additional safety provisions which were required.

While solventless resin systems had been previously developed for the uses set forth herein, and while they are adequate for most purposes, they do present certain problems. For example, the silicone materials remain extremely expensive while the polyesters, either employed as such, or generated because of reaction between various components in a resin system, have a degree of hydrolytic instability.

SUMMARY OF THE INVENTION

In accordance with the present invention, a resin composition, useful as an impregnant and encapsulating material for dry type transformers comprises:

1. 100 parts by weight, of a butadiene polymer having the formula:

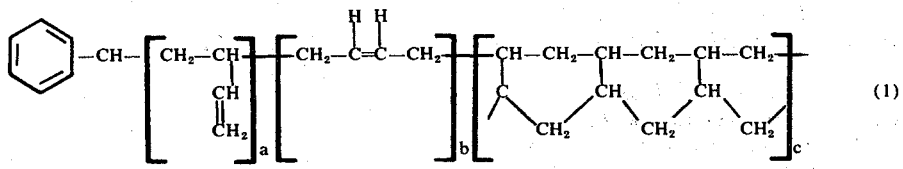

where $a$ comprises from 40 to 80% of the groups in the polymer chain, $b$ comprises from 10 to 20% of the groups in the polymer chain, and $c$ comprises from 15 to 35% of the groups in the polymer chain, the sum of $a$, $b$ and $c$ being sufficient to provide a molecular weight of from 1700 to 2100;

2. From 10 to 34 parts, by weight, of a vinyl monomer selected from the group consisting of:

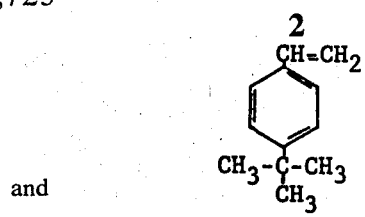

and

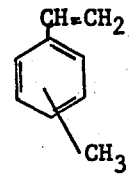

and

3. From 5 to 11 parts, by weight, of trimethylol propane trimethacrylate, having the formula:

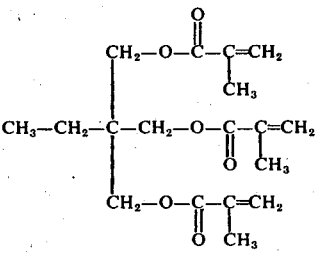

The solventless resin system just described is compatible with the insulated wire and other material employed in dry type transformers. In addition to the three major components set forth above, the composition generally contains an inhibitor to prevent premature polymerization of the components, an initiator, particularly a peroxide initiator, and, may further contain a "kicker" in order to initiate the curing reaction.

The inhibitor employed is generally selected from the class consisting of quinones and hydroquinones. Preferably, the inhibitor is hydroquinone employed in amounts of from 0.05 to 0.15 part by weight.

While a variety of peroxide initiators can be employed, including benzoyl peroxide, lauryl peroxide, and dicumyl peroxide, the preferred peroxide initiator is that sold under the name Lupersol 101 which has the formula:

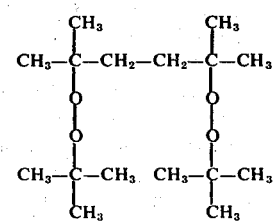

The materials referred to above can be mixed at 60°C, in large quantities, and are storage stable for extended periods at that temperature. On raising the temperature to 70°C, the mixture reaches the proper viscosity to be employed as an impregnant for dry type transformers, and can then be vacuum impregnated into a porous mass of phenolic coated sand which has been placed about the coil of such a transformer.

Further, the resin system of the present invention can be mixed with a particular type of sand to be used as an encapsulating material for dry type transformers. In particular, the encapsulating composition can contain from 25 to 18%, by weight, of the resin system of the present invention along with 75 to 82%, by weight, of a granular filter material. This granular filter material is a silicon dioxide sand having a maximum ferrous oxide content of 0.110% and a majority of particles in the range of 1981 to 833 microns.

Employing the resin system of the present invention either as an impregnant for dry type transformers, or as a component of an encapsulant for such transformers, a transformer system is formed with insulation capabilities to 180°C.

DESCRIPTION OF THE PREFERRED EMBODIMENTS

Figure 1:
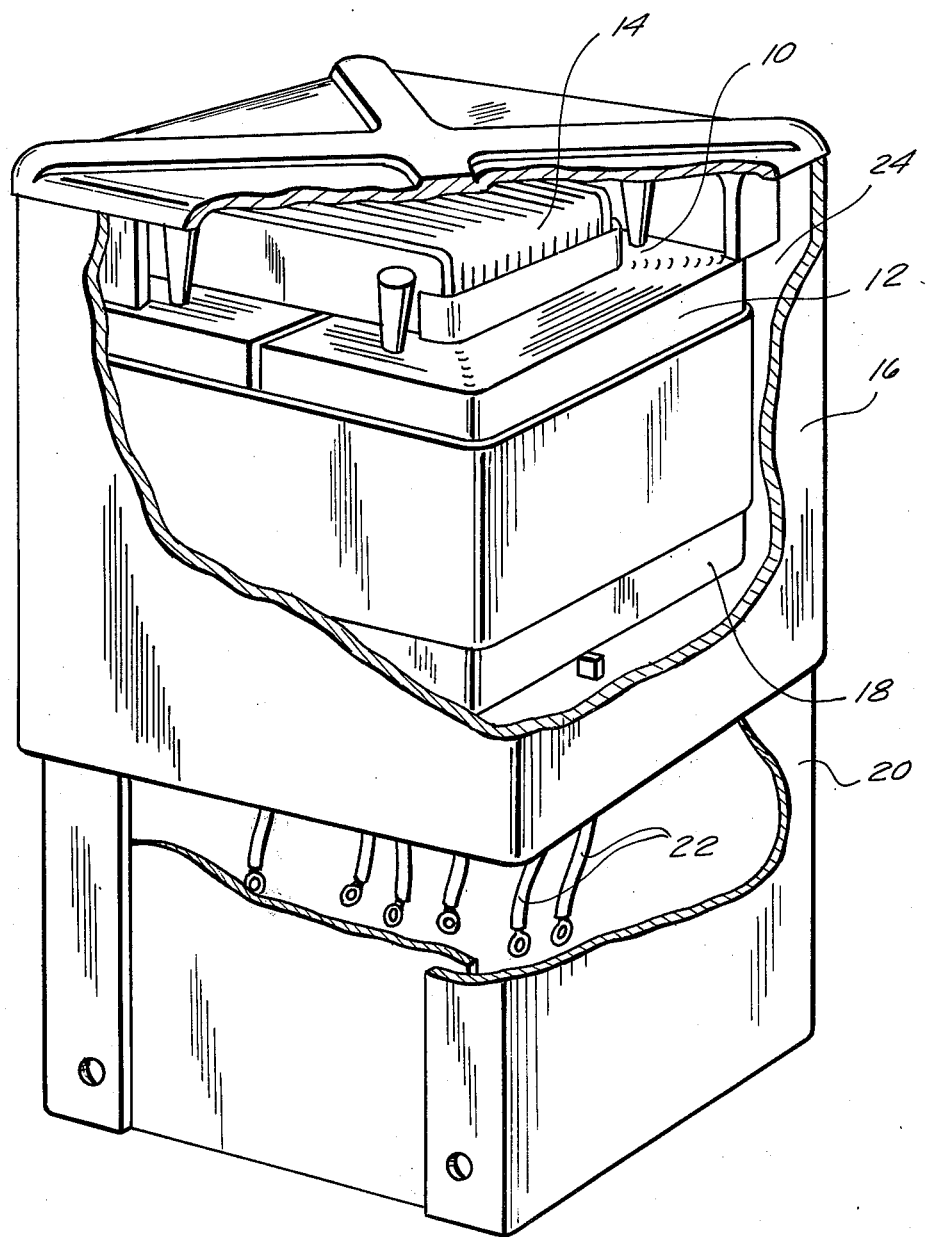
FIG. 1 is a perspective view, partially cut away, showing a totally enclosed core and coil assembly.

The totally enclosed transformer of FIG. 1 is of a type generally employed in control systems. Illustrated are a core and coil assembly 10 including a magnetic core 12 and a coil 14. The particular type of core and coil assembly are not critical to the present invention. The core and coil assembly 10 is contained within a transformer case or enclosure 16 and a barrier 18, of some type, is generally positioned beneath the core and coil assembly 10. A lead compartment 20 is fitted beneath the open end of enclosure 16 for placement of transformer leads 22.

With the type of transformer illustrated in FIG. 1, two methods for employing the resin system of the present invention are possible. In the first case, the resin system is employed as an impregnant. The space 24 between the core and coil assembly 10 and the enclosure 16 is filled with a phenolic coated sand. This phenolic coated sand is heated so as to fuse the coatings of adjacent particles to each other, resulting in a porous mass. After this porous mass has cooled, so as to solidify it, the resin system of the present invention is vacuum impregnated into the pores and is cured in place. In a second method, the resin system of the present invention is combined with a particular type of sand, the sand being carefully selected as to size, purity, and shape in order to provide a substantially void-free encapsulating mass. In general, this sand is a 99% pure silicon dioxide sand, at least 95% by weight of the sand being between U.S. Standard Sieve Sizes 10 and 20, i.e. within a range of 1981 to 833 microns. Generally, it is desired that at least 70% of the sand be between U.S. Standard Sieve Sizes 14 and 16, i.e. within a range of 1397 to 1167 microns. Further, the sand should have a maximum ferrous oxide content of 0.110% The resin system of the present invention and the sand are mixed, the overall composition having from 25 to 18% of the resin system of the present invention and from 75 to 82% sand, both percentages by weight. This mixture is then placed around the core and coil assembly 10 of FIG. 1 in space 24 in order to encapsulate the core and coil assembly 10.

Figure 2:
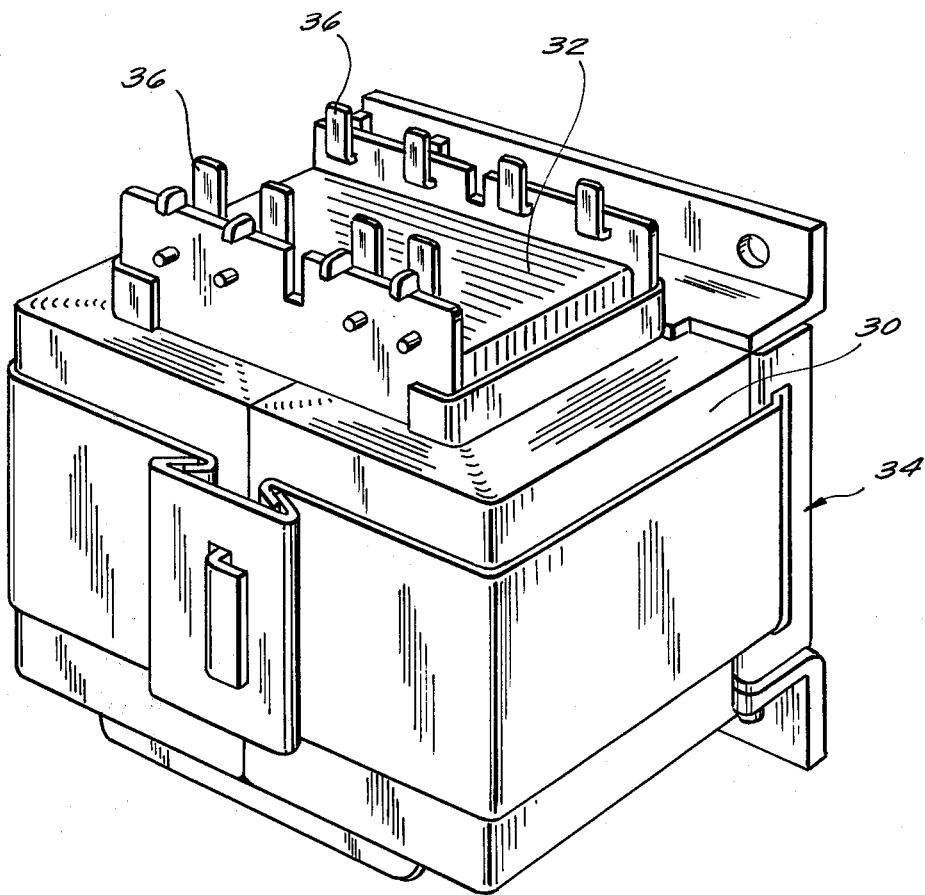
FIG. 2 is a perspective view of a transformer core coil.

The transformer of FIG. 2 is of a type generally employed in machine tools. It includes a core 30, coil 32, and a frame member 34 to hold the various parts together. Terminals 36 are also provided on the structure. In general, the insulating resin system of the present invention is coated over a transformer of the type shown in FIG. 2 as by dipping the tranformer into a bath containing the resin system of the present invention.

As previously indicated, the resin system of the present invention comprises:

1. 100 parts, by weight of a butadiene polymer having the formula:

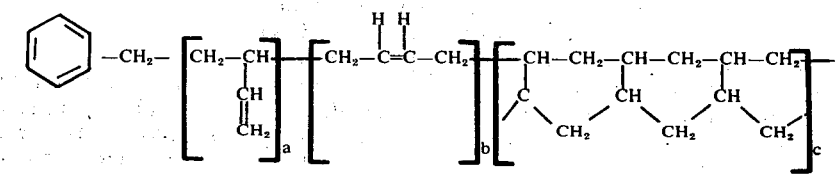

where $a$ is from 40 to 80% of the total of $a$, $b$ and $c$, $b$ is from 10 to 20% of the total of $a$, $b$ and $c$, and $c$ is from 15 to 35% of the total of $a$, $b$ and $c$, the total number of $a$, $b$ and $c$ units being sufficient for the polymer to have a molecular weight of from 1700 to 2100;

2. From 10 to 34 parts, by weight, of a vinyl monomer selected from the class consisting of:

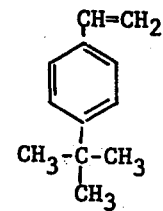

and

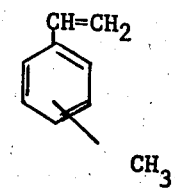

and

3. From 5 to 11 parts, by weight, trimethylol propane trimethacrylate, having the formula:

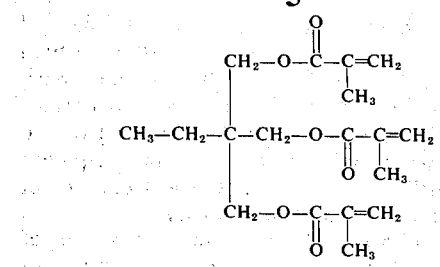

As previously indicated, the butadiene polymer of formula (1) has a molecular weight of between 1700 and 2100. Additionally, it has a viscosity of between 50,000 and 70,000 centipoise at 35°C, as measured on a Brookfield viscometer. The viscosity of the butadiene polymer is important in order that the overall resin system will have the desired viscosity for impregnation. In this polymer, as indicated by the subscripts $a$, $b$ and $c$, there is approximately 10 to 20% trans-1,4 unsaturation. There is no more than a trace of cis-1,4 unsaturation. Of the original vinyl unsaturation in the materials of the polymer, from 40 to 80% remains as such in component $a$, while the remaining amount is cyclized within the polymer chain, as indicated by component $c$. The polymer chains of the butadiene are, as indicated, terminated by phenyl groups. The butadiene polymer of formula (1) is reactive towards free radical polymerization by virtue of the large percentage of the vinyl unsaturation present.

The second component of the resin system, a vinyl monomer selected from the class consisting of t-butyl styrene and vinyl toluene, is selected because of its ability to form a cross-linked polymer with the butadiene polymer of formula (1). Further, the materials are selected for their low vapor pressure which aids, significantly, in reducing atmospheric pollution. The t-butyl styrene has a boiling point of 219°C, a density of 0.884, and a viscosity of 1.46 centipoise. The vinyl toluene has a boiling point of 167°C, a density of 0.897, and a viscosity of 0.78 centipoise.

Through the combination of the vinyl monomer and the butadiene polymer, a solventless resin system is formed which can be employed for impregnation of dry type transformers operating at temperatures up to 180°C. This solventless system provides added moisture protection, heat transfer improvement, and generally upgrades the transformer insulation, as compared to prior art materials, while eliminating many of the undesirable features of a solvent resin impregnant or encapsulant. The resulting system is also compatible with the insulated wire and other materials in the dry type transformer.

The other monomer included in the formulation of the resin system of the present invention is a material which has a higher functionality than either of the vinyl monomers. Because of this higher functionality, the material is more reactive than the other monomers and as such acts as a kicker to initiate the curing reaction. A particularly desirable material has been found to be trimethylol propane trimethacrylate.

In order for the resin system of the present invention to be used to greatest effectiveness, it must be storage stable at 60°C. By this it is meant that the mixture of the three components just described can be held together in large quantities at that temperature without any significant cure. As an aid to assuring this storage stability, quinone and hydroquinone in amounts from 0.05 to 0.15 parts by weight, are generally incorporated with the resin system. A preferred material is hydroquinone.

In addition to the stabilizer, an initiator is generally required for effecting the curing reaction between the various components of the resin system. Various peroxide materials have been found most effective for this purpose including benzoyl peroxide, lauryl peroxide, and dicumyl peroxide. The most effective peroxide initiator has been found to be Lupersol 101 which has the formula:

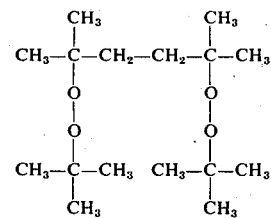

The peroxide initiator is employed in amounts of from about 1 to 3 parts by weight.

To be useful for impregnation of dry type transformers, a resin system must have a viscosity between about 100 and 350 centipoise when measured with an LVT Brookfield viscosimeter employing a number 2 spindle. The system of the present invention has been found to have a viscosity within the limits at temperatures of from 65°C to 75°C, having the optimum operating viscosity of 125 centipoise at 70°C. The composition of the resin system as previously described provides an optimum exotherm temperature at minimum viscosity during the short impregnating cycle. Further, little or no post-heating of the impregnated transformers was required, which lowered atmospheric pollution by vinyl monomers to less than 5 lbs. per hour, employing a system operating on a continuous basis.

By controlling the viscosity of the material as indicated above, the gel-time-temperature relationship is very attractive for achieving short processing cycles. For example, the materials of the present invention gel in approximately 8.5 minutes at 135°C, 4 minutes at 150°C, 3.5 minutes at 160°C, and 3 minutes at 170°C. These processing times are 50% lower than comparable alkyd polyester solvent systems. As a result, considerably more impregnant can be more efficiently retained in the transformer with improved heat transfer characteristics. The more efficient heat transfer characteristics can be observed from a review of the data in table I, below, where the thermal conductivity factor (K) is the indicated number, which was determined for both polybutadiene and alkyd systems in the form of slabs, both with and without sand.

TABLE I

| Type of System | With Sand | Without Sand |
| --- | --- | --- |
| polybutadeine | 14.63 × 10⁻⁴ | 2.77 × 10⁻⁴ |
| alkyd | 13.12 × 10⁻⁴ | 1.7 × 10⁻⁴ |

Various tests were performed to show that transformers employing the resin system of the present invention could be rated at 180°C hotspot. A first preliminary test involved the use of thermogravimetric analysis (TGA). For a 5% weight loss, the polyester curve, for comparison, crossed at approximately 250°C. For the same weight loss, the polybutadiene curve employing the resin system of the present invention crossed at approximately 350°C. The more expensive silicone curve, for the same weight loss, crossed at approximately 400°C. Further, the polyimide curve crossed at approximately 540°C.

A further test to establish the ability of the resin system of the present invention to function as an impregnant in 180°C capability transformers was thermal stability according to an isothermal weight loss procedure. According to this procedure, a fixed amount of the material was heated at a fixed temperature for a period of time to determine the weight loss at that temperature. These accelerated aging tests were at 200°C for two weeks and at 300°C for one week. The results of these tests are shown below, in Table II.

TABLE II

| System | Weight Loss (%) | |
|---|---|---|
| | 200°C | 300°C |
| polybutadiene | 1.38 | 6.96 |
| polyester | 1.23 | 53.58 |

It can thus be seen that under the accelerated condition of Table II, the polybutadiene system was superior to the polyester system. The polybutadiene system also showed less weight loss than an epoxy-polyester system when tested at 300°C for one week.

Better thermal conductivity was also experienced employing the resin system of the present invention. Several 500 Volt-Amp transformers were treated with a solvent type polyester system and several other transformers, of the same type, were treated with the material of the present invention. The transformers were subjected to load and the load caused a 110°C average temperature rise in the polyester treated transformers, while under the same load conditions, those employing the butadiene resin system of the present invention showed an average rise of 88°C.

The electrical characteristics of the resin system of the present invention were also superior to those of prior art materials. In running these tests, an open weave glass cloth was treated with the materials referred to in Table III, below, and the various electrical readings were taken. The cloths were 0.007 inch thick and the properties measured included electrical strength, in volts per mil, dielectric constant, and dissipation factor at 25°C. The results are:

TABLE III

| Impregnating Material | Electrical Strength (volts per mil) | Dielectric Constant | Dissipation Factor (25°C) |
|---|---|---|---|
| polyester | 1500 | 5.2 | 0.028 |
| polybutadiene | 1500 | 2.6 | 0.011 |
| silicone | 1400 | 4.2 | 0.025 |

Thus, the solventless polybutadiene resin system of the present invention has an electrical strength equivalent to the polyester material of the prior art, that strength being somewhat higher than the electrical strength of the silicone material. The dielectric constant, which should be low in an electrical system so that the electrical stress will divide more evenly across the materials, is much superior in the polybutadiene system of the present invention. This, along with the low dissipation factor is probably attributable to the low content of polar groups and the lack of aromaticity.

Transformers impregnated with the resin system of the present invention were life tested according to IEEE Test No. 259. According to this test, which is designed to test the integrity of the insulation system under various conditions, the transformers are placed in a chamber at 90°F and 95% relative humidity for 48 hours. The transformers are then removed and placed back on thermal aging tests. Successful operation at this time indicates successful system integrity to the action of moisture. It also indicates that little or no hydrolysis has taken place in the insulation system. One of the failings of a polyester system is the fact that the polyester will hydrolyze under these test conditions, thus resulting in failure of the transformer. Six 500 Volt-Amp transformers were prepared and vacuum impregnated with the polybutadiene resin system of this invention. The transformers were tested at a hot-spot temperature of 270°C and the log average of hours to failure was 516. The minimum requirements, according to IEEE Test No. 259 for a 180°C system at 270°C hotspot is 350 hours. Thus, the system of the present invention is equal to, or greater than, that of the 180°C hotspot system.

The results set forth above for the resin system of the present invention were based upon a formulation containing 100 parts by weight of the butadiene polymer of formula (1) where $a$ was 0.6, $b$ was 0.15, and $c$ was 0.25, having a molecular weight of 1900 and a viscosity of 60,000, along with 22 parts vinyl toluene, 8 parts trimethylol propane trimethacrylate, 2 parts Lupersol 101, and 0.05 parts hydroquinone. Additional runs were made with the resin system of the present invention employing different proportions of materials, as indicated below:

Various other specific formulations falling within the resin system of the present invention were prepared and tested for at least some of the properties set forth in this application. Testing on various formulations included gel-time, pot life, and viscosity. Specific mixtures having the formulations as set forth in Table IV were found to have acceptable properties. All parts in Table IV are by weight:

TABLE IV

| Sample No. | Poly-butadiene | t-butyl styrene | Vinyl toluene | Trimethylol propane tri-methacrylate | Peroxide | Hydro-quinone |
|---|---|---|---|---|---|---|
| A | 100 | | 20 | 10 | 2 | 0.05 |
| B | 100 | | 23 | 7 | 2 | 0.05 |
| C | 100 | | 22 | 8 | 2 | 0.05 |
| D | 100 | | 10 | 10 | 2 | 0.05 |
| E | 100 | | 25 | 5 | 2 | 0.05 |

TABLE IV-continued

| Sample No. | Poly-butadiene | t-butyl styrene | Vinyl toluene | Trimethylol propane tri-methacrylate | Peroxide | Hydro-quinone |
|---|---|---|---|---|---|---|
| F | 100 | 25 |  | 5 | 1 | 0.05 |
| G | 100 |  | 15 | 5 | 2 | 0.05 |
| H | 100 | 25 |  | 5 | 2 | 0.05 |

Thus, a resin system useful for impregnating or encapsulating electrical equipment, particularly dry type transformers, has been shown. This system possesses many advantageous properties when compared with material of the prior art. The invention should not be considered as limited to the specific examples shown and described, but only as limited by the appended claims.

We claim:

1. A resin system for use in the insulation of electrical equipment comprising the reaction product of:
   a. 100 parts of a butadiene polymer having the formula:

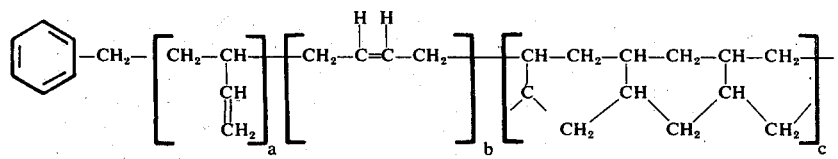

where $a$ is from 0.40 to 0.80, $b$ is from 0.10 to 0.20, and $c$ is from 0.15 to 0.35, the sum of $a$, $b$, and $c$ being sufficient for the polymer to have a molecular weight of from 1700 to 2100;
   b. from 10 to 34 parts, by weight, of a vinyl monomer selected from the class consisting of t-butyl styrene and vinyl toluene; and
   c. from 5 to 11 parts, by weight, trimethylol propane trimethacrylate.

2. The resin system of claim 1, having, in addition, from 1 to 3 parts of a peroxide catalyst.

3. The resin system of claim 2, wherein the peroxide catalyst is:

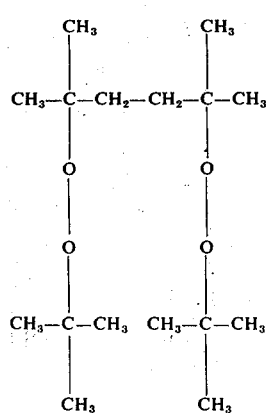

4. The resin system of claim 1, having, in addition, a polymerization inhibitor selected from the class consisting of quinones and hydroquinones.

5. The resin system of claim 4, wherein the inhibitor is hydroquinone.

6. The resin system of claim 1, wherein the vinyl monomer is t-butyl styrene.

7. The resin system of claim 1, wherein the vinyl monomer is vinyl toluene.

8. A dry type transformer having, as a portion of the electrical insulation, a resin system comprising the reaction product of:
   a. 100 parts of a butadiene polymer having the formula:

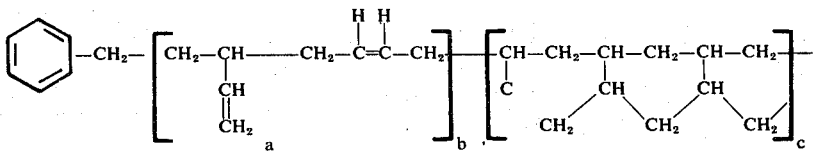

where $a$ is from 0.40 to 0.80, $b$ is from 0.10 to 0.20, and $c$ is from 0.15 to 0.35, the sum of $a$, $b$, and $c$ being sufficient for the polymer to have a molecular weight of from 1700 to 2100;
   b. from 10 to 34 parts, by weight, of a vinyl monomer selected from the class consisting of t-butyl styrene and vinyl toluene; and
   c. from 5 to 11 parts, by weight, trimethylol propane trimethacrylate.

9. The invention of claim 8, having, in addition, from 1 to 3 parts of a peroxide catalyst.

10. The invention of claim 9, wherein the peroxide catalyst is:

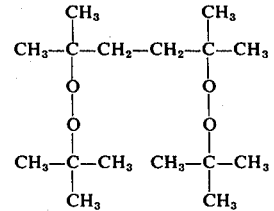

11. The invention of claim 10, having, in addition, a polymerization inhibitor selected from the class consisting of quinones and hydroquinones.

12. The invention of claim 11, wherein the inhibitor is hydroquinone.

13. The invention of claim 12, wherein the vinyl monomer is t-butyl styrene.

14. The invention of claim 13, wherein the vinyl monomer is vinyl toluene.

* * * * *